United States Patent
Spandern et al.

(10) Patent No.: US 7,754,001 B2
(45) Date of Patent: Jul. 13, 2010

(54) METHOD FOR PRODUCING A FRICTION MATERIAL MASS AND FRICTION LININGS MADE THEREFROM

(75) Inventors: Christian Spandern, Elkenroth (DE); Sabine Wolf, Obererbach (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 720 days.

(21) Appl. No.: 11/642,102

(22) Filed: Dec. 20, 2006

(65) Prior Publication Data
US 2007/0105978 A1    May 10, 2007

Related U.S. Application Data

(63) Continuation of application No. PCT/EP2005/006794, filed on Jun. 23, 2005.

(30) Foreign Application Priority Data
Jun. 23, 2004    (EP) .................. 04014670

(51) Int. Cl.
C08J 5/14 (2006.01)
C09K 3/14 (2006.01)
C09K 3/18 (2006.01)
C04B 12/04 (2006.01)
C04B 28/26 (2006.01)
C04B 35/16 (2006.01)

(52) U.S. Cl. .................. 106/36; 106/600; 106/623; 106/626; 523/149

(58) Field of Classification Search .................. 523/149; 106/600, 623–626, 36; 188/251 A
See application file for complete search history.

(56) References Cited

U.S. PATENT DOCUMENTS

| | | | | |
|---|---|---|---|---|
| 2,877,198 | A * | 3/1959 | Morrissey | 523/155 |
| 4,341,840 | A * | 7/1982 | Prewo | 428/408 |
| 4,412,863 | A * | 11/1983 | Neely, Jr. | 106/623 |
| 5,049,191 | A * | 9/1991 | Pflug et al. | 106/36 |
| 5,433,774 | A * | 7/1995 | Kapl et al. | 106/36 |
| 5,817,411 | A * | 10/1998 | Nakajima | 428/334 |
| 6,220,405 | B1 * | 4/2001 | Kesavan et al. | 188/251 A |
| 6,265,071 | B1 * | 7/2001 | Gross et al. | 428/408 |
| 6,481,555 | B1 * | 11/2002 | Hell et al. | 192/107 M |

FOREIGN PATENT DOCUMENTS

| | | |
|---|---|---|
| FR | 2 723 411 | 2/1996 |
| GB | 267961 | 1/1928 |
| GB | 280901 | 5/1928 |
| GB | 303100 | 6/1929 |

* cited by examiner

Primary Examiner—Anthony J Green
Assistant Examiner—Pegah Parvini
(74) Attorney, Agent, or Firm—Simpson & Simpson, PLLC

(57) ABSTRACT

The invention concerns a method for producing a friction material mass, in particular for friction linings in vehicles, in which essentially fibrous material, fillers, lubricants, metallic components and binding agents are wet-processed. In order to be able to produce from the friction material mass friction linings with increased thermostability, water glass is used as binding agent.

6 Claims, No Drawings

METHOD FOR PRODUCING A FRICTION MATERIAL MASS AND FRICTION LININGS MADE THEREFROM

CROSS-REFERENCE TO RELATED APPLICATIONS

This application is filed under 35 U.S.C. §120 and §365(c) as a continuation of International Patent Application PCT/EP2005/006794, filed Jun. 23, 2005 and published Jan. 5, 2006, which application is incorporated herein by reference. This application also claims priority from European Patent Application No. 04014670.6, filed Jun. 23, 2004, which application is incorporated herein by reference.

FIELD OF THE INVENTION

The invention relates to a method for producing a friction material mass, in particular for friction linings in motor vehicles. An additional aspect of the invention relates to friction linings produced from this friction material mass. The friction material mass serves for the production of friction linings as pressed, hardened, formed bodies such as disk linings, drum linings, and clutch linings which are used to brake, or to connect in a force-locking manner, moving parts.

BACKGROUND OF THE INVENTION

A significant field of application for friction linings is that of vehicles, in particular motor vehicles, rail vehicles, and aircraft. However, friction linings are also used in mechanical equipment.

Known friction linings, which can also be called friction lining mixtures, include reinforcement fibers such as glass, aramide, PAN, viscose; fillings materials, such as heavy spar, kaolin, or mica; metals in the form of powder, cuttings, or wires; and slip agents or solid lubricants such as antimony sulfide, molybdenum sulfide, or graphite. These components are connected by at least one organic binding agent, such as phenol resins, and types of rubber, such as SBR or NBR. For wet-prepared friction material masses, aqueous and solvent-containing resols are also used.

It is common to all the applications of friction linings that the adhesion factor or coefficient of friction is stable over as wide a range of temperatures as possible. Furthermore, the countermaterial of the counterpiece, e.g., a cast iron brake disk or pressure plate in a clutch, should be as non-corrosive as possible and itself be wear-resistant. Stability of form at high temperatures is also important.

It has already been attempted to meet the product-specific demands on friction linings, in particular by the choice of the binding agent, where, for example, with the use of novolak-hexamethylene tetramine powdered resin the novolak base was physically and chemically modified or the cross-link density of the material was influenced by different hexamethylene tetramine content of the powdered resin. In so doing, there was an effect on temperature stability, in particular in modifications with phosphorous, boron, and silicon compounds (Kunststoffhandbuch, Handbook of Plastics, Volume 10 (duroplasts), published by Prof. Dr. Wilbrand Woebcken, $2^{nd}$ Edition 1998, Carl Hanser Verlag, Munich, Vienna, ISBN 3-446-14418-8).

Nevertheless, when using organically bound friction linings with a high thermal load the organic components are still always subject to decomposition reactions which have as a consequence wear and fading effects. In this connection it is to be taken into account that, e.g., in brake disks, temperature peaks up to 1000° C. can occur. Due to growing motor powers, vehicle weights, and new technologies such as, for example, double-clutch transmissions, greater and greater demands with regard to temperature stability or thermostability are being placed on friction linings.

SUMMARY OF THE INVENTION

Thus, the present invention is based on the objective of providing a friction material mass from which friction linings with increased thermostability can be produced and in fact without negative impacts on the properties of the friction linings with regard to convenience, i.e. freedom from squeaking and hard rubbing, and with as little complexity in production as possible.

This objective is realized according to the invention by the fact that, instead of the binding agents customary in the past, liquid glass is used.

With this surprisingly simple binding agent, friction material masses for friction linings can be produced which exhibit no decomposition reactions even at high temperatures far above 500° C., have uniform coefficients of friction, and form stable frictional layers in which the actual work done by the frictional force is carried out. Fading effects are accordingly low or absent. The wear rates are stable in the high temperature range. With the exception of using liquid glass instead of organic binding agents, it is thus not absolutely necessary to replace previous material components of the friction material mass.

As liquid glass, potassium as well as sodium silicates comes into consideration.

The following specification relates to practically pure potassium silicates and their viscose aqueous solutions.

DETAILED DESCRIPTION OF THE INVENTION

It has turned out that in a wide range of binding agent percentages very usable friction material masses can be produced, and in fact with 10% by weight to 70% by weight liquid glass relative to the entire dry friction material mass.

Along with this, the percentages of the remaining components are in the ranges specified in claim 3. Two wet formulations for the specified limit values of the liquid glass percentage of 10% by weight to 70% by weight, which in each case relate to the entire dry percentage in the formulation, are specified below.

According to the further aspect of the invention the friction linings, in particular for motor vehicles, consist of the friction material mass produced as specified above with the advantageous properties stated above.

In the following, the two wet formulations for the friction material mass are given as concrete examples.

|  | Formulation 1 % by weight | Formulation 2 % by weight |
| --- | --- | --- |
| Liquid glass | 10 | 70 |
| Mica | 10 | 5 |
| Heavy spar | 10 | 5 |
| Glass fibers | 14 | 5 |
| Graphite | 20 | 10 |
| Copper | 36 | 5 |
| Water | 15 | 105 |

For the production of the friction linings from such a wet-prepared friction material mass, the water is removed once again in the following drying processes. In other respects the further production of the friction linings is conventional.

Friction linings from a friction material mass, which were produced according to each of the two formulations given above, showed no decomposition reactions up to 700° C. The adhesion factor remained stable up to at least 550° C., where higher temperatures could not be produced in the test. This test also produced no fading effects up to the stated temperature. A stable friction layer formed up to at least 550° C. The wear rates were stable at least up to this high temperature range.

The invention claimed is:

1. A method for the production of a friction material mass, in particular for friction linings in motor vehicles, which comprises combining essentially fibrous material, filling materials, slip agents, metal portions, and binding agents in water utilizing liquid glass as the binding agent in the absence of silica.

2. The method for the production of a friction material mass recited in claim 1, wherein 10% by weight to 70% by weight liquid glass relative to the entire dry friction material mass is used.

3. The method recited in claim 2, wherein the entire friction material mass comprises:

| | |
|---|---|
| 10% to 70% | liquid glass |
| 10% to 5% | mica |
| 10% to 5% | heavy spar |
| 14% to 5% | glass fibers |
| 20% to 10% | graphite |
| 36% to 5% | copper |
| 15% to 105% | water | where the percentage is by weight relative to the entire dry friction material mass.

4. A friction lining, in particular for motor vehicles, comprising essentially fibrous material, filling materials, slip agents, metal portions, and binding agents, wherein said friction lining is wet-prepared, wherein liquid glass is used as the binding agent in the absence of silica.

5. The friction lining recited in claim 4 wherein 10% by weight to 70% by weight liquid glass relative to the entire dry friction material mass is used.

6. The friction lining recited in claim 5, wherein the entire friction material mass comprises:

| | |
|---|---|
| 10% to 70% | liquid glass |
| 10% to 5% | mica |
| 10% to 5% | heavy spar |
| 14% to 5% | glass fibers |
| 20% to 10% | graphite |
| 36% to 5% | copper |
| 15% to 105% | water. |

* * * * *